US012612124B1

(12) United States Patent
Rosenboom

(10) Patent No.: US 12,612,124 B1
(45) Date of Patent: Apr. 28, 2026

(54) TRACK ASSEMBLY

(71) Applicant: Lyn A. Rosenboom, Clifton, IL (US)

(72) Inventor: Lyn A. Rosenboom, Clifton, IL (US)

( * ) Notice: Subject to any disclaimer, the term of this patent is extended or adjusted under 35 U.S.C. 154(b) by 391 days.

(21) Appl. No.: 18/201,865

(22) Filed: May 25, 2023

(51) Int. Cl.
*B62D 55/14* (2006.01)
*B62D 55/24* (2006.01)

(52) U.S. Cl.
CPC ............. *B62D 55/14* (2013.01); *B62D 55/24* (2013.01)

(58) Field of Classification Search
CPC ................................ B62D 55/14; B62D 55/24
USPC .......................................................... 305/136
See application file for complete search history.

(56) References Cited

U.S. PATENT DOCUMENTS

| | | | | | |
|---|---|---|---|---|---|
| 3,292,943 | A | * | 12/1966 | Crockett | B60G 9/02 |
| | | | | | 280/124.167 |
| 3,724,580 | A | * | 4/1973 | Adams, Jr. | B62D 49/0621 |
| | | | | | 305/153 |

| | | | | | |
|---|---|---|---|---|---|
| 5,279,378 | A | * | 1/1994 | Grawey | B62D 55/30 |
| | | | | | 305/136 |
| 5,409,305 | A | * | 4/1995 | Nagorcka | B62D 55/15 |
| | | | | | 305/153 |
| 6,712,549 | B2 | * | 3/2004 | Roth | B62D 55/104 |
| | | | | | 404/83 |
| 7,380,892 | B2 | * | 6/2008 | Rosenboom | B62D 55/305 |
| | | | | | 180/9.46 |
| 9,919,751 | B1 | * | 3/2018 | Rosenboom | B62D 55/244 |
| 2002/0005629 | A1 | * | 1/2002 | Rosenboom | B62D 55/06 |
| | | | | | 280/504 |
| 2007/0138866 | A1 | * | 6/2007 | Rosenboom | B62D 55/0842 |
| | | | | | 305/125 |
| 2015/0166133 | A1 | * | 6/2015 | Eavenson, Sr. | B62D 55/10 |
| | | | | | 305/134 |
| 2015/0321708 | A1 | * | 11/2015 | Van Mill | B62D 55/06 |
| | | | | | 280/28.5 |
| 2022/0089231 | A1 | * | 3/2022 | Aubin-Marchand | B62D 55/15 |
| 2022/0089232 | A1 | * | 3/2022 | Aubin-Marchand | B62D 55/15 |

* cited by examiner

*Primary Examiner* — S. Joseph Morano
*Assistant Examiner* — Eva L Comino
(74) *Attorney, Agent, or Firm* — Philip L. Bateman

(57) ABSTRACT

A track assembly for a land vehicle has idler wheels and road wheels that pivot about a common horizontal axis so the road wheels do not rub against the guide blocks of the belt when the land vehicle is transported over a crowned road. The elimination of rubbing decreases friction and heat and, thereby, increases the life of the belt.

3 Claims, 8 Drawing Sheets

TRACK ASSEMBLY

FIELD OF THE INVENTION

This invention relates to track assemblies for land vehicles.

BACKGROUND OF THE INVENTION

A track assembly supports and facilitates movement of a land vehicle. A track assembly contains a continuous belt (also known as a band, a tread, or a track) that contacts the ground and rotates around a plurality of wheels. A track assembly is an alternative to wheels that contact the ground directly. Matching track assemblies are used on each side of a vehicle. Track assemblies are widely used in farm equipment (e.g, tractors, wagons, planters, fertilizers), military equipment (e.g., tanks), and construction equipment (e.g., bulldozers). Military equipment and heavy construction equipment typically have belts made of interconnected metal plates. Farm equipment (also known as agricultural implements) typically have belts made of reinforced synthetic rubber. When compared to wheels, a track assembly contacts the ground over a much greater surface area. The increased surface area provides greater traction, less compaction of the ground, a smoother ride over rough and uneven ground, and improved ability to function in muddy conditions.

The track assemblies on some vehicles contain drive wheels that are turned by an engine or motor that rotate the belt and provides movement to the vehicle. The track assemblies on other types of vehicles contain only free wheeling, unpowered wheels commonly known as idler wheels. These unpowered vehicles must be pulled by a separate, powered vehicle.

A wide variety of track assemblies are known. A simplified conventional track assembly 10 for an unpowered vehicle is shown in FIGS. 1 to 5, 9, 11, 13, and 15. The track assembly shown is for the left side of the vehicle with the front of the vehicle to the left and the rear of the vehicle to the right. The track assembly for the right side of the vehicle is a mirror image of the track assembly for the left side. For brevity, only the left sides of track assemblies are shown and described herein. The track assembly has a front unpowered idler wheel 20, a rear unpowered idler wheel 30, two smaller road wheels 40 (also known as bogie wheels), a belt 50, and a frame 60. The front idler wheel is formed of an inner wheel 21 and an outer wheel 22 mounted on a horizontal spindle 23 (also known as a shaft) that is attached to a pivoting member 24. The rear idler wheel is formed of an inner wheel 31 and an outer wheel 32 mounted on a horizontal spindle 33 that is attached to a pivoting member 34. Each road wheel is formed of an inner wheel 41 and an outer wheel 42 mounted on a horizontal spindle 43 that is attached to a pivoting member 44. The spindles for the idler wheels pivot about axes that are typically much higher off the ground than the pivot axes of the spindles for the road wheels.

The inner surface of the belt 50 contains a series of discrete guide blocks 51 that fit within the inner wheels and the outer wheels. Alternatively, the inner surface of the belt contains one continuous guide block. The guide blocks keep the belt aligned by making light, incidental, and intermittent contact with the wheels if and when the belt shifts to one side or the other. A section of the belt is shown in FIG. 3 with the height of the guide blocks exaggerated for illustration purposes.

The track assembly is shown from the rear in FIGS. 4, 9, 11, 13, and 15 with a portion of the belt omitted and with the upper and lower portions of the belt shown as sections. In FIG. 4, the belt is shown with the guide blocks exactly between the inner wheel and the outer wheel. As previously mentioned, the belt tends to move slightly from side to side so the guide blocks occasionally make light, incidental, and intermittent contact with the wheels. The belt is completely omitted for illustration purposes in FIG. 2. The outer wheels are omitted for illustration purposes in FIG. 5.

Conventional track assemblies on unpowered farm equipment work well in the fields where the weight of the vehicle is distributed over the entire ground-contacting portion of the track. A serious problem arises because farm equipment must often be transported for long distances on paved roads. If a road is perfectly flat, the wheels do not rub against the guide blocks as shown in FIGS. 9 and 11. FIG. 9 is a rear view with the rear idler wheel shown in the forefront. FIG. 11 is a rear view taken in front of the rear idler wheel so a road wheel is shown in the forefront. However, roads are generally crowned (higher at the center than along the sides) so that water drains off the road. Paved roads often have a cross slope of about two to three percent while unpaved roads often have a cross slope of about five to six percent. Unless otherwise indicated expressly or by context, the term "about" is used herein to mean plus or minus ten percent of the measurement or other quantified property referenced. When farm equipment is transported on a crowned road, the road wheels press firmly against inner side of the guide blocks as shown in FIGS. 13 and 15. FIG. 13 is a rear view with the rear idler wheel shown in the forefront. FIG. 15 is a rear view taken in front of the rear idler wheel so a road wheel is shown in the forefront.

The pressing of the road wheels against the guide blocks of the belt generates friction and heat. Heat, in turn, causes degradation and eventual failure of the belt. Many attempts have been made to provide a belt material that is more resistant to heat. However, nothing in the prior art has taught a solution to the problem by reducing or eliminating the friction and heat.

Accordingly, there is a demand for a track assembly that eliminates pressing of the road wheels against the guide blocks of the belt when the vehicle is transported on crowned roads.

SUMMARY OF THE INVENTION

The general object of this invention is to provide an improved track assembly. A more particular object is to provide a track assembly with road wheels that do not press against the guide blocks of the belt when the vehicle is transported on crowned roads.

I have invented an improved track assembly. The track assembly comprises: (a) a front idler double wheel having a diameter, the front idler double wheel having an inner wheel mounted on a pivoting spindle, an outer wheel mounted on the spindle, with a recess between the inner wheel and the outer wheel; (b) a rear idler double wheel having a diameter, the rear idler double wheel having an inner wheel mounted on a pivoting spindle, an outer wheel mounted on the spindle, with a recess between the inner wheel and the outer wheel; (c) a road double wheel between the front idler double wheel and the rear idler double wheel, the road double wheel having a diameter that is less than the diameter of the front idler double wheel and the diameter of the rear idler double wheel, the road double wheel having an inner wheel mounted on a pivoting spindle, an outer wheel mounted on the spindle, with a recess between the inner wheel and the outer wheel; (d) a continuous belt having an inner surface with a continuous guide block or a plurality of discrete guide blocks, the belt extending around the front idler double wheel, the rear idler double wheel, and the road double wheel; and (e) a frame in the recess between the inner wheels and the outer wheels of the front idler double wheel, the rear idler double wheel, and the road double wheel, the frame extending from the front idler double wheel to the rear idler double wheel; wherein the pivoting spindles of the front idler double wheel, the rear idler double wheel, and the road double wheel pivot about a common longitudinal axis.

The track assembly of this invention has idler wheels and drive wheels that do not press against the guide blocks of the belt when the vehicle is transported on crowned roads. This absence of pressing decreases friction and heat and greatly increases the life of the belt.

BRIEF DESCRIPTION OF THE DRAWINGS

FIG. 10 is a rear view of a preferred embodiment of the track assembly of this invention on a flat surface as seen from a point in front of the rear idler wheel.

FIG. 11 is a rear view of a prior art track assembly on a flat surface as seen from a point in front of the rear idler wheel.

DETAILED DESCRIPTION OF THE INVENTION

Figure 1:
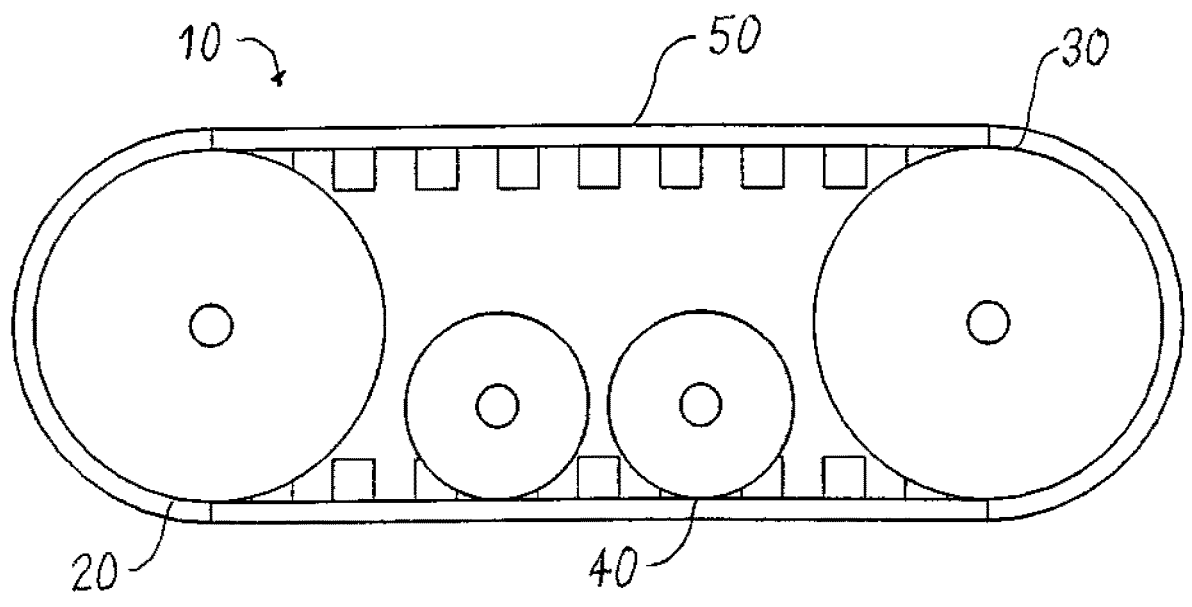
FIG. 1 is a side elevation view of a prior art track assembly.
Figure 2:
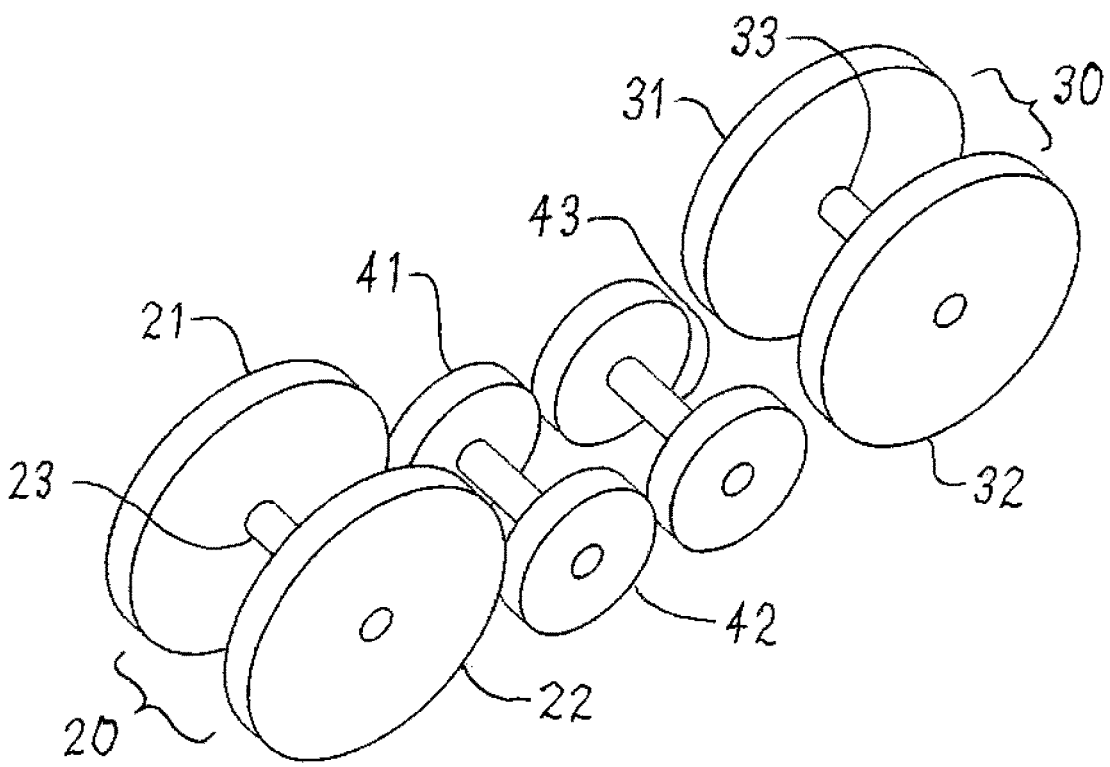
FIG. 2 is a perspective view thereof with the belt and frame omitted.
Figure 3:
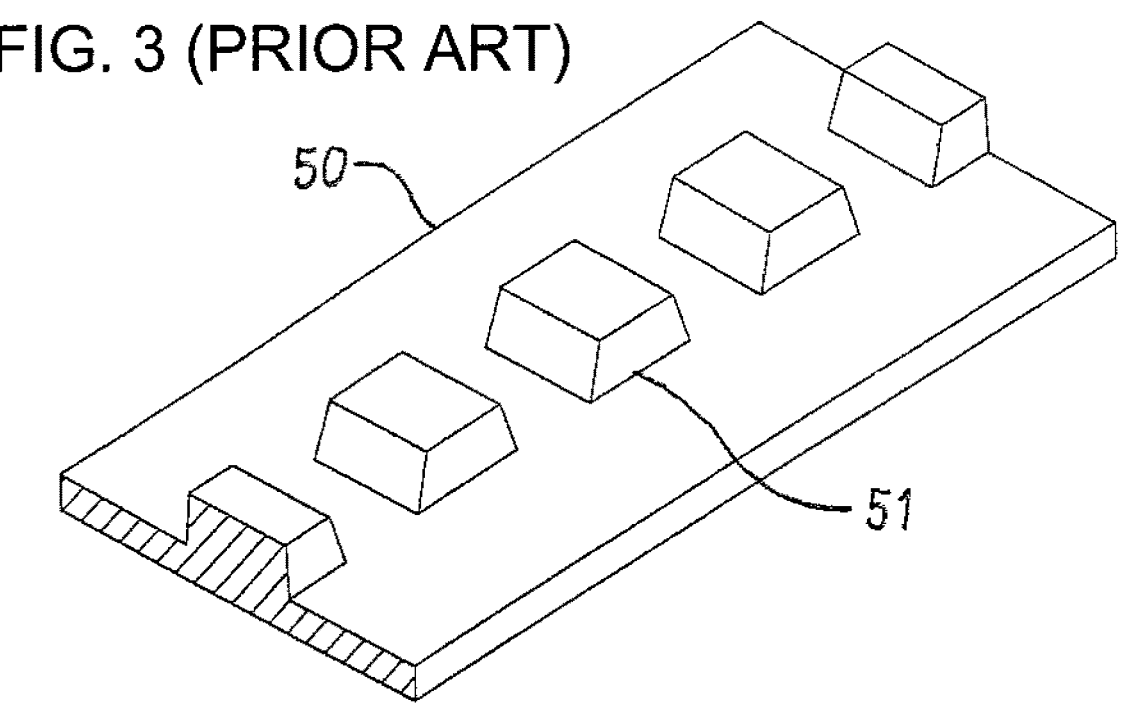
FIG. 3 is a perspective view of a section of the belt thereof.
Figure 4:
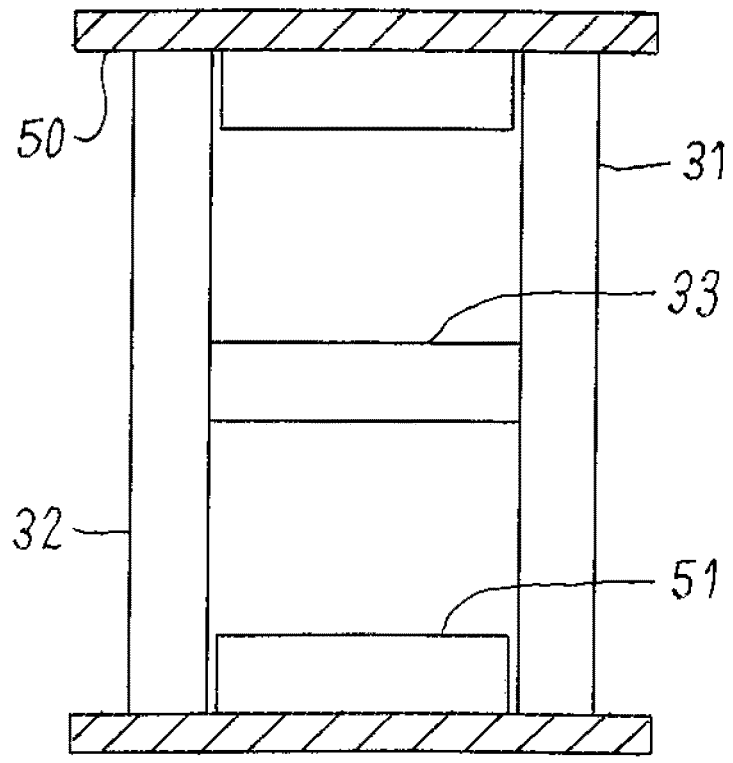
FIG. 4 is an end partial section view thereof.
Figure 5:
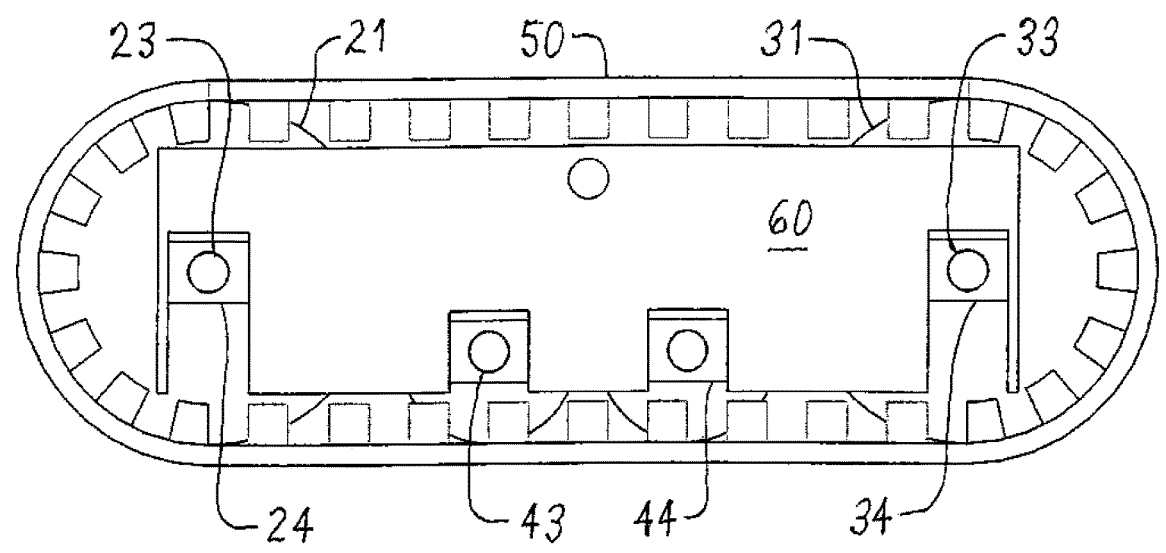
FIG. 5 is a side elevation view thereof with the outer wheels omitted.

This invention is best understood by reference to the drawings. Referring to FIGS. 6 to 8, 10, 12, and 14, the track assembly 110 of this invention is especially suited for unpowered vehicles. The track assembly comprises a front idler double wheel 120, a rear idler double wheel 130, two road double wheels 140, a continuous belt 150 with guide blocks, and a frame 160. These components are discussed in more detail below. The track assembly of this invention has road wheels that do not press against the guide blocks of the belt when the vehicle is transported on crowned roads. This absence of rubbing decreases friction and heat and greatly increases the life of the belt.

Figure 6:
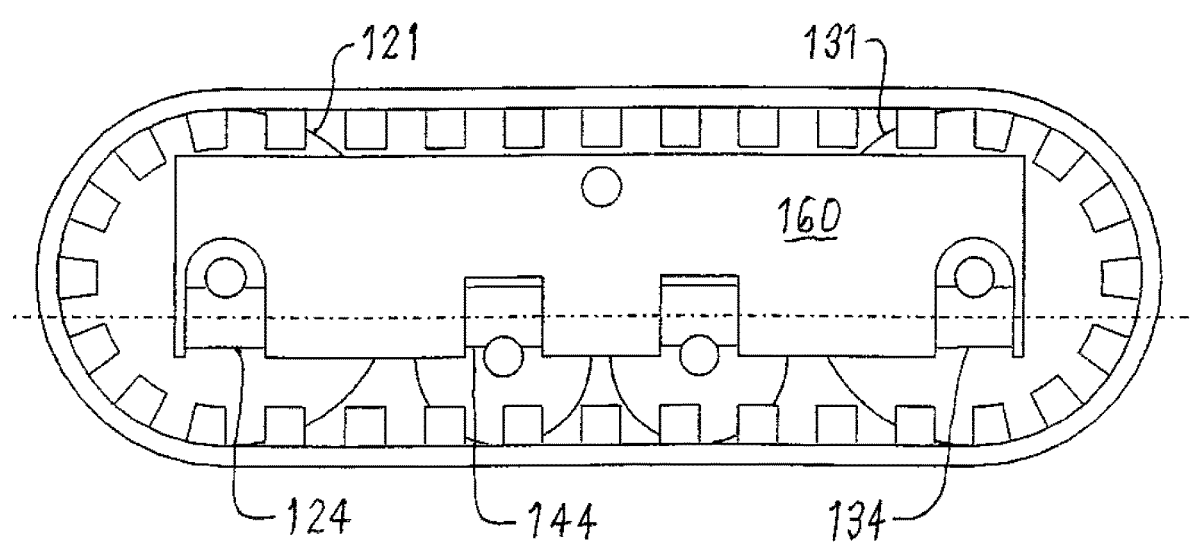
FIG. 6 is a side elevation view of a preferred embodiment of the track assembly of this invention with the outer wheels omitted.
Figure 7:
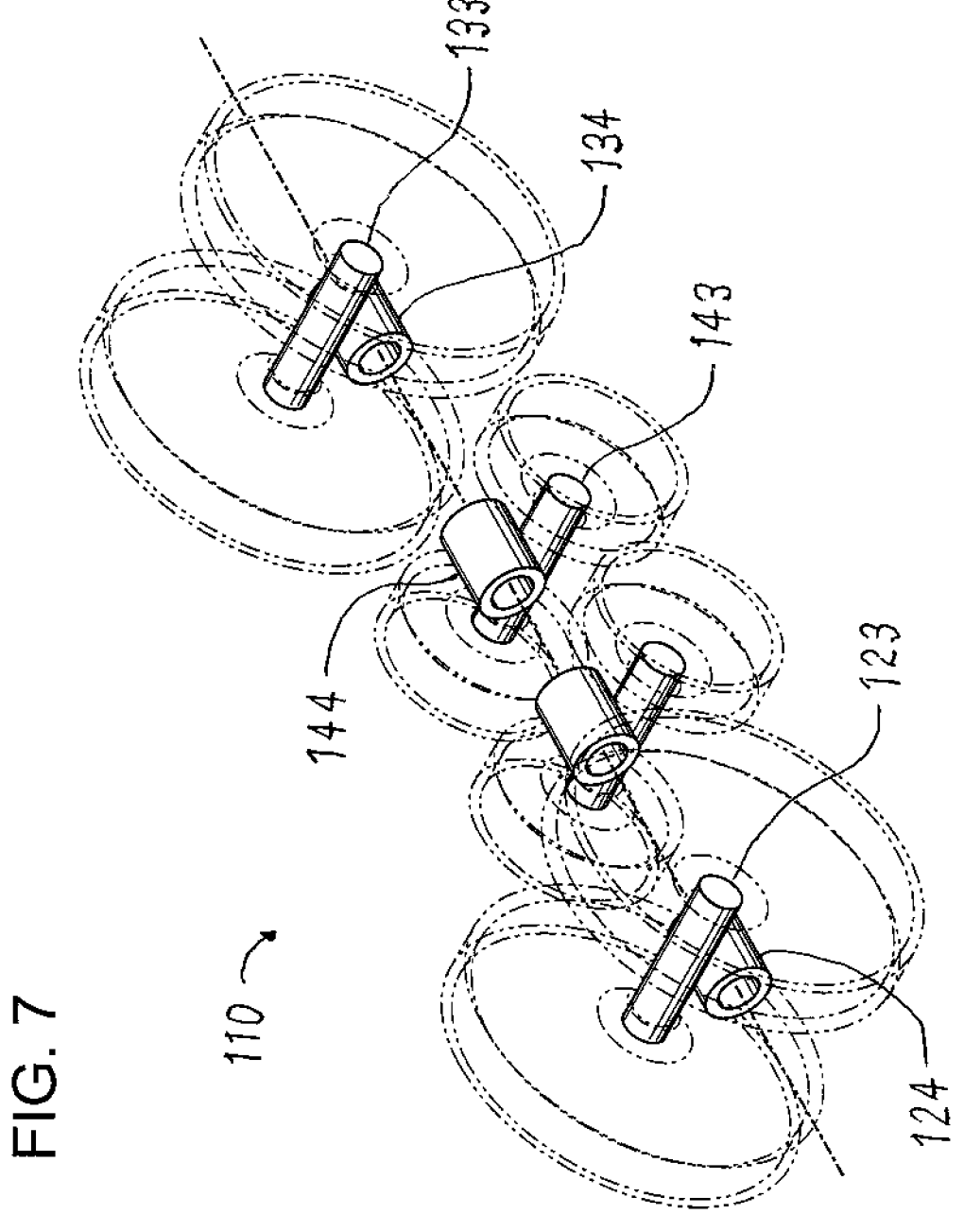
FIG. 7 is a perspective view thereof with the belt and frame omitted and with the wheels shown in phantom lines.
Figures 8, 9:
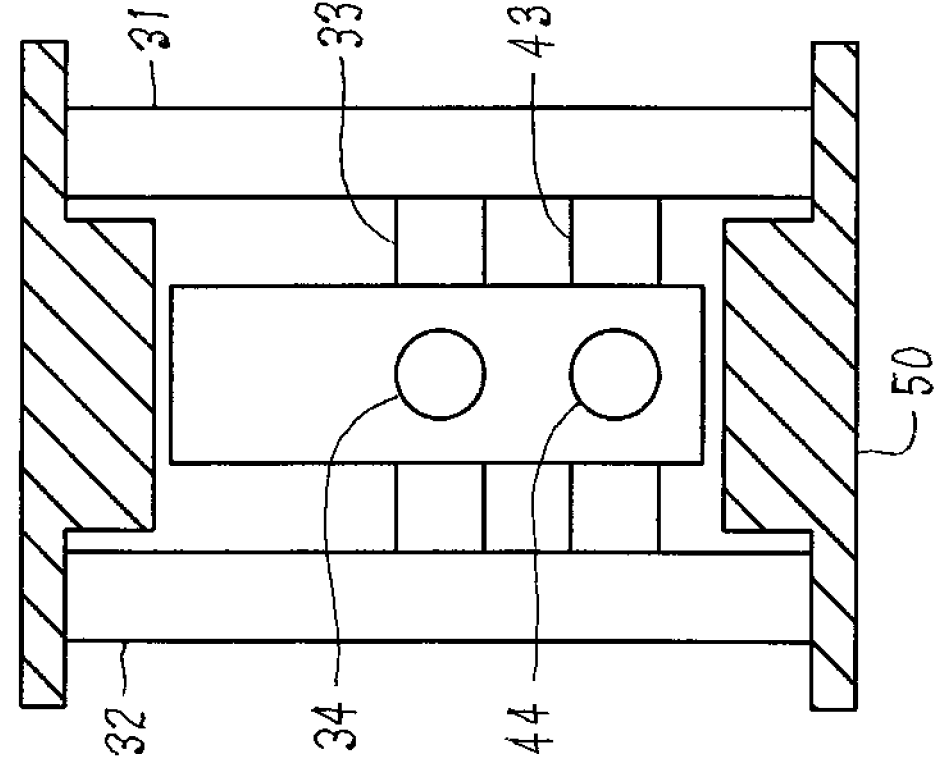
FIG. 8 is a rear view thereof on a flat surface.
FIG. 9 is a rear view of a prior art track assembly on a flat surface.
Figures 10, 11:
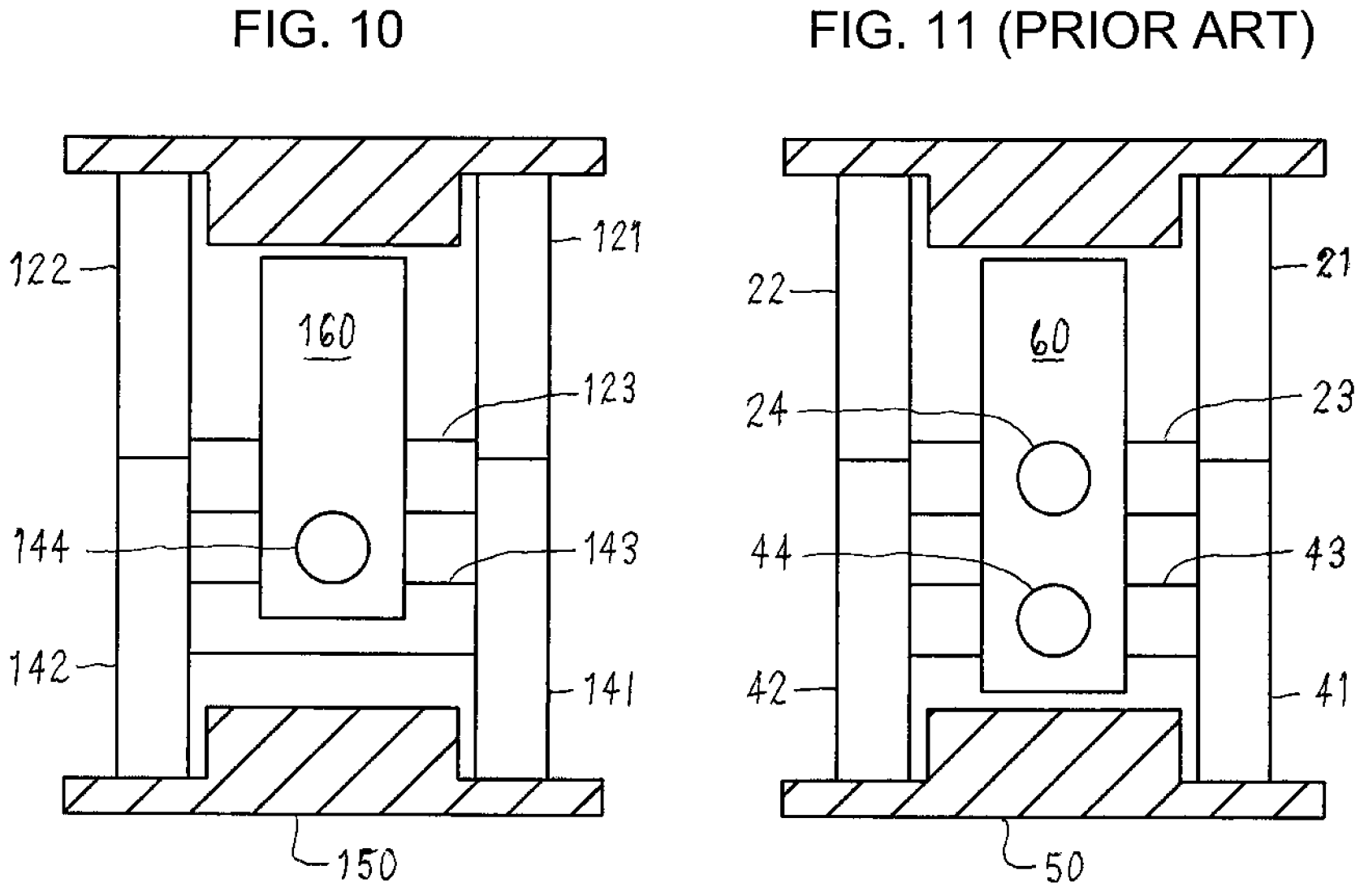

The track assembly shown is for the left side of the vehicle. The track assembly for the right side of the vehicle is a mirror image of the track assembly for the left side. For brevity, only the left side of the track assembly is shown and described herein. In FIG. 6, the outer wheels are omitted for illustration purposes. In FIG. 7, the belt is completely omitted for illustration purposes. The track assembly is shown from the rear in FIGS. 8, 10, 12, and 14 with a portion of the belt omitted and with the upper and lower portions of the belt shown as sections.

The front idler double wheel 120 contains an inner wheel 121 and an outer wheel 122 connected by a common spindle 123 and separated by a recess. The spindle is attached to the top of a tube 124. The tube is supported by a pin on the frame to allow the tube and the spindle to pivot freely. The pivoting spindle allows the inner wheel and the outer wheel to conform to a sloped surface.

The rear idler double wheel 130 is similar or identical in diameter and structure to the front idler double wheel. It contains an inner wheel 131, an outer wheel 132, and a spindle 133. The inner wheel and the outer wheel are separated by a recess. This recess is preferably equal to or slightly greater than the recess between the inner wheel and the outer wheel of the front idler wheel. It has been found that the front idler wheels confine the guide blocks of the belt sufficiently (by limiting side to side movement) so that the same amount of confinement is unnecessary as the belt travels rearwardly. Increasing the recess decreases the wear on the belt. The spindle is attached to the top of a tube 134 that is supported by a pin on the frame to allow the tube and spindle to pivot freely.

The track assembly of this invention contains at least one road double wheel 140. The track assembly generally contains one to four road wheels. The preferred embodiment as shown contains two road wheels. Each road wheel is similar in structure to the front idler double wheel and the rear idler double wheel. It contains an inner wheel 141, an outer wheel 142, and a spindle 143. The inner wheel and the outer wheel are separated by a recess. This recess is preferably equal to or slightly greater than the recess between the inner wheel and the outer wheel of the front idler wheel. It has been found that the front idler wheels confine the guide blocks of the belt sufficiently (by limiting side to side movement) so that the same amount of confinement is unnecessary as the belt travels rearwardly. Increasing the recess decreases the wear on the belt. The spindle is attached to a tube 144 that is supported by a pin on the frame. The road double wheel differs from the idler wheels in two respects. First, it is smaller in diameter than the idler wheels. Second, its spindle is attached to the bottom, rather than the top, of the tube so all the tubes form a common, or an approximately common, longitudinal axis as discussed in more detail below.

The continuous belt 150 has a plurality of guide blocks 151 on its inner surface. The guide blocks fit within the inner wheels and the outer wheels of the idler and road wheels and keep the track aligned. Alternatively, the inner surface of the belt contains one continuous guide block.

The frame 160 extends from the front idler double wheel to the rear idler double wheel in the recess between the inner wheels and the outer wheels of the idler and road wheels. The frame is connected to the vehicle and contains pins that support the assemblies comprising the tubes, spindles, and wheels. The frame is preferably an integral structure, but is a formed from a combination of structures if desired.

Figures 12, 13:
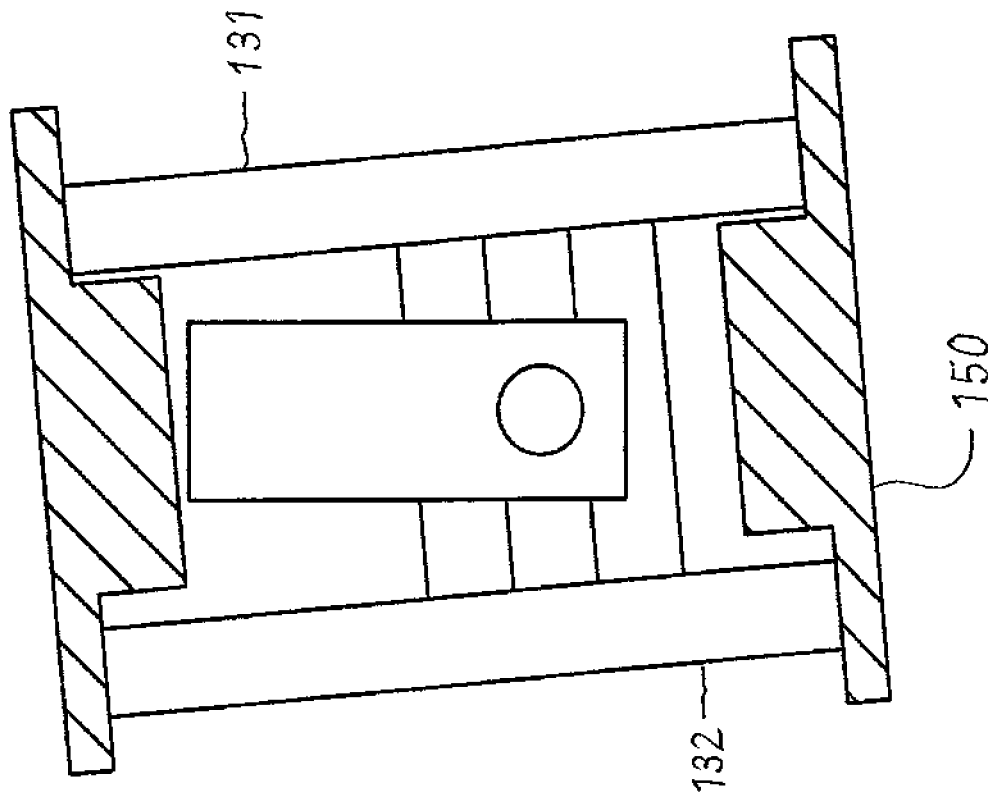
FIG. 12 is a rear view of a preferred embodiment of the track assembly of this invention on a sloped surface.
FIG. 13 is a rear view of a prior art track assembly on a sloped surface.
Figures 14, 15:
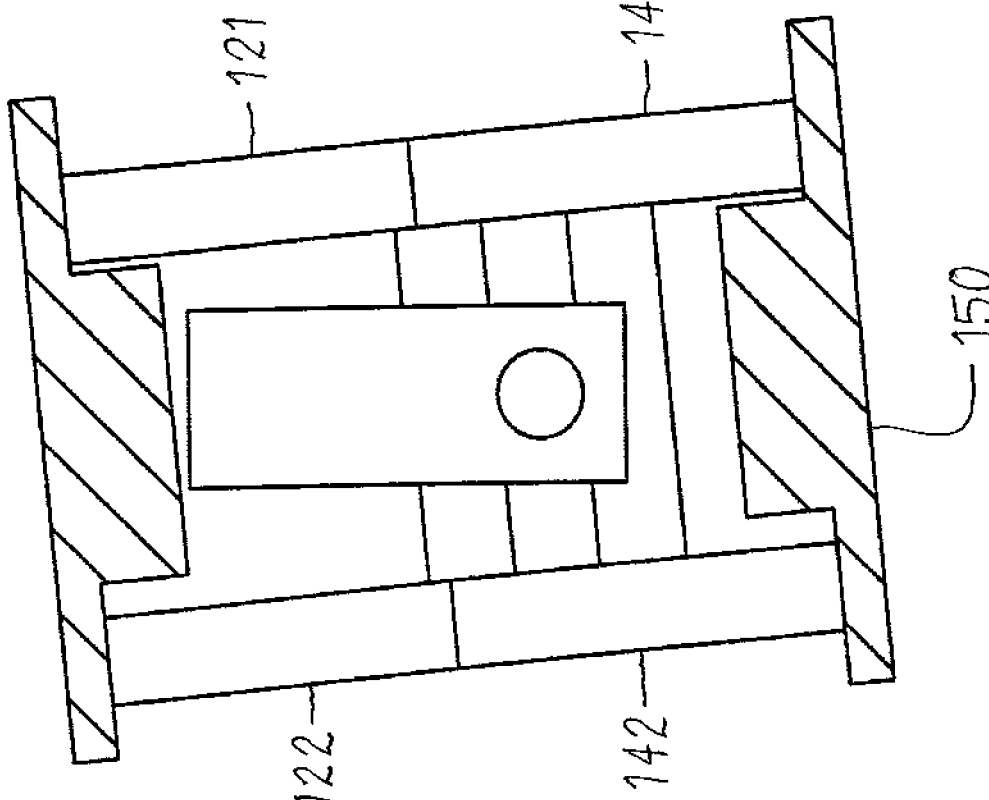
FIG. 14 is a rear view of a preferred embodiment of the track assembly of this invention on a sloped surface as seen from a point in front of the rear idler wheel.
FIG. 15 is a rear view of a prior art track assembly on a sloped surface as seen from a point in front of the rear idler wheel.

As previously mentioned, the tubes form a common, or an approximately common, longitudinal pivoting axis. It has been discovered that arranging the tubes on a common longitudinal axis eliminates the pressing of the sides of the road wheels against the guide blocks of the belt when the vehicle is transported on crowned roads. This absence of pressing can best be seen by comparing FIG. 12 to FIG. 13 and FIG. 14 to FIG. 15. In the track assembly of this invention shown in FIGS. 12 and 14, the spindles for all the wheels pivot about a common longitudinal axis so that the idler wheels and road wheels maintain their alignment over a crowned road. In FIGS. 12 and 14, the belt is shown with the sides of the guide blocks making no contact with any of the wheels. If any misalignment occurs, it results in light, incidental, and intermittent contact between the inner idler wheels and the inner road wheels and the guide block. In a prior art track assembly shown in FIGS. 13 and 15, the spindles for the idler wheels and the road wheels pivot about different longitudinal axes so the idler wheels and road wheels diverge over a crowned road, resulting in the road wheels 41 pressing against the inner side of the guide blocks.

This absence of pressing on the guide blocks decreases friction and heat and greatly increases the life of the belt. Depending on the geometry of the wheels and spindles, the pressing of the wheels against the guide blocks is eliminated even when the tubes are not precisely on a common longitudinal axis. Stated in another way, the tubes are arranged on axes that are close enough to each other to eliminate the pressing of the sides of the road wheels against the guide blocks when the track assembly travels on a sloped road. Quantifying in one way, it can be said that the axes of the tubes are preferably close enough to eliminate pressing of the road wheels against the guide blocks when the track assembly is traveling on a crowned road with a slope of about three degrees. Quantifying in a second way, it can be said that the axes are preferably all within a distance of about three inches, i.e., the highest axis is no more than about three inches above the lowest axis. Quantifying in a third way, it can be said that the axes are preferably all within a distance equal to about twenty percent, and most preferably about ten percent, of the diameter of the front idler wheel. For example, if the front idler wheel has a diameter of 30 inches, the axes are preferably within about six inches and most preferably within about three inches.

It can be appreciated that the pressing of the road wheels against the guide blocks is distinguished from the light, incidental, and intermittent contact made by all the wheels against one side the guide blocks if and when the belt shifts to one side or the other. In the former case, a force pushes the road wheels against the guide blocks and continues continuously as long as the track assembly remains on a crowned road. In the latter, the belt is free to move slightly from side to side to relieve the friction on one side of the guide blocks. The track assembly of this invention eliminates the former and has no effect on the latter. As previously discussed, the former causes rapid degradation and failure of the belt. The latter does not.

I claim:

1. A track assembly comprising:

a front idler double wheel having a diameter, the front idler double wheel having an inner wheel mounted on a pivoting spindle, an outer wheel mounted on the spindle, with a recess between the inner wheel and the outer wheel;

a rear idler double wheel having a diameter, the rear idler double wheel having an inner wheel mounted on a pivoting spindle, an outer wheel mounted on the spindle, with a recess between the inner wheel and the outer wheel;

a road double wheel between the front idler double wheel and the rear idler double wheel, the road double wheel having a diameter that is less than the diameter of the front idler double wheel and the diameter of the rear idler double wheel, the road double wheel having an inner wheel mounted on a pivoting spindle, an outer wheel mounted on the spindle, with a recess between the inner wheel and the outer wheel;

a continuous belt having an inner surface with a continuous guide block or a plurality of discrete guide blocks, the belt extending around the front idler double wheel, the rear idler double wheel, and the road double wheel; and a frame in the recess between the inner wheels and the outer wheels of the front idler double wheel, the rear idler double wheel, and the road double wheel, the frame extending from the front idler double wheel to the rear idler double wheel;

wherein the pivoting spindles of the front idler double wheel, the rear idler double wheel, and the road double wheel pivot about a common longitudinal axis.

2. The track assembly of claim 1 additionally comprising a second road double wheel, which second road double wheel has a diameter about the same as the diameter of the first road double wheel.

3. The track assembly of claim 2 wherein each pivoting spindle is connected to a rotating tube.

\* \* \* \* \*